(12) United States Patent
Duval

(10) Patent No.: US 6,671,185 B2
(45) Date of Patent: Dec. 30, 2003

(54) INTELLIGENT FASTENERS

(76) Inventor: Landon Duval, 1200 Pacific Coast Hwy. #316, Huntington Beach, CA (US) 92648

( * ) Notice: Subject to any disclaimer, the term of this patent is extended or adjusted under 35 U.S.C. 154(b) by 0 days.

(21) Appl. No.: 09/997,164

(22) Filed: Nov. 28, 2001

(65) Prior Publication Data

US 2003/0099102 A1 May 29, 2003

(51) Int. Cl.⁷ .................................................. H05K 7/00
(52) U.S. Cl. ...................... 361/807; 728/801; 411/457; 257/678
(58) Field of Search ................................. 361/728, 736, 361/752, 753, 801, 807; 174/159; 411/457; 257/678

(56) References Cited

U.S. PATENT DOCUMENTS

| | | | |
|---|---|---|---|
| 3,894,174 A | * 7/1975 | Cartun | 174/159 |
| 5,539,252 A | 7/1996 | Brorby | |
| 5,620,289 A | * 4/1997 | Curry | 411/444 |
| 5,807,048 A | 9/1998 | d'Agraives et al. | |
| 5,821,615 A | * 10/1998 | Lee | 257/686 |
| 5,879,069 A | * 3/1999 | Chien | 362/103 |
| 6,244,804 B1 | 6/2001 | Hodge | |

* cited by examiner

Primary Examiner—Jayprakash N. Gandhi
(74) Attorney, Agent, or Firm—Gene Scott-Patent Law & Venture Group

(57) ABSTRACT

A fastener apparatus comprises in combination, a mechanical binding device such as a staple. The staple engages substrates such as sheets of paper forming a document. A microcomputer is mounted integrally with the staple and includes a data storage device such as a solid state memory providing a capacity for receiving and transferring a quantity of digital data. The microcomputer also provides a data processing device such as a microprocessor which provides a capacity for calculation using the digital data. A bi-directional data transfer port is adapted for receiving the digital data for transfer to the data storage device and to the data processing device and for transferring the digital data from the data storage device and from the data processing device. Data may be stored and retrieved electrostatically, magnetically, optically and mechanically so as to identify the document for identification and retrieval.

4 Claims, 1 Drawing Sheet

INTELLIGENT FASTENERS

BACKGROUND OF THE INVENTION

1. Field of the Invention

This invention relates generally to data storage systems and also, to locator systems and more particularly to a fastening device that provides the properties of data storage as well as the ability to install data into and retrieve data from the device and to locate the device when needed, as for instance in filing systems.

2. Description of Related Art

The following art defines the present state of this field:

Hodge, U.S. Pat. No. 6,244,804 teaches several embodiments of tension-indicating fasteners that include tension indicators having indicating arms equipped with a laterally-extending contact member or a foot portion. A contact member extends in a tangential direction from the fastener head. The indicating arm is secured to the fastener and, by having laterally-distant contact points, the deflection of a substrate caused by the fastener head causes a distal end of the indicating arm to move with amplified magnitude. In still other embodiments of the invention, a fastener includes tension indicia for indicating a target degree of substrate deflection. The tension indicator may be disposed within a recess in the fastener head to allow the use of conventional tightening tools.

d'Agraives et al., U.S. Pat. No. 5,807,048 teaches a sealing fastener including a unique identifier device for the individual fastener that enables ultrasonic identification of the device using an ultrasonic fault measuring system, and a frangible element within the fastener integrated with the identifier device that provides an ultrasonic signature indicating an attempt to loosen or remove the fastener when subjected to an ultrasonic signal generated by an ultrasonic fault measuring system. The unique identifier device includes a stack of individual metallic washer elements brazed together, with each washer element including discontinuities or cavities that are randomly arranged with respect to the cavities of the other washers in the stack. The fastener includes relatively movable portions that cause fracture of the frangible element upon any attempt to loosen or remove a fastener after it has been tightened or secured at its sealing location. An ultrasonic reading device includes an adapter that cooperates with the fastener to precisely locate an ultrasonic transducer with respect to the identifier and indicator so that a signature of the identifier and the indicator can be obtained in a single step using a single ultrasonic reading head associated with an ultrasonic fault detector system.

Brorby, U.S. Pat. No. 5,539,252 teaches a fastener provided with onboard memory in the form of a non-volatile memory device. The fastener defines a casing with an elongate body and a transverse gripping head, such casing defining a bore into which the nonvolatile memory device is placed. The memory device is mounted on a circuit board having a first side which defines a plurality of electrically conductive contacts for use in communicating with the memory device. The electrically conductive contacts are selectively exposed to provide access to the memory device. The other side of the circuit board is placed inside the casing and covered with potting material. Simple wiring on the small board, using through-hole vias, suffices to route power, ground, and data lines to the memory device, while providing a sealed durable package with at least three external contacts and fastening capabilities.

The prior art teaches the use of fasteners that provide indications of fastener status such as tensile condition, fasteners that provide the ability to be read by proximity devices, and fasteners with included memory features for the storage of data and with contacts for electrical signal transfer for reading the memory stored data, but fails to teach a fastener device having intelligence in the form of a microcomputer with data storage and processing capacity, wave energy signal transfer capability and optical recognition indicia. The present invention fulfills these needs and provides further related advantages as described in the following summary.

SUMMARY OF THE INVENTION

The present invention teaches certain benefits in construction and use which give rise to the objectives described below.

A fastener apparatus comprises in combination, a mechanical binding device such as a staple. The staple engages any type of material substrate such as sheets of paper forming a document. A microcomputer is mounted integrally with the staple and includes a data storage device such as a solid state memory providing a capacity for receiving and transferring a quantity of digital data. The microcomputer also provides a data processing device such as a microprocessor which provides a capacity for calculation using the digital data. A bi-directional data transfer port is adapted for receiving the digital data for transfer to the data storage device and to the data processing device and for transferring the digital data from the data storage device and from the data processing device. Data may be stored and retrieved electrostatically, magnetically, optically and mechanically so as to identify the document for identification and retrieval. Applications of the present invention include the identification of the document through a reader of the codes on or in the binding device, locating the document through a reader that is able to locate a particular binding device and select it from a large number of such devices in close proximity such as in a filing cabinet, transferring data into the binding device via static, magnetic or contact data transfer so as to reclassify the document, for instance, or the like, inputting data into the binding device so as to update the information or data stored therein and also to enable data processing within the invention to update statistical information as one example. Clearly, the invention may be facilitated with passwords to protect the stored data and allow retrieval from only authorized personnel. The data may be any material including what is contained within the document or other.

A primary objective of the present invention is to provide an apparatus and method of use of such apparatus that provides advantages not taught by the prior art.

Another objective is to provide such an invention capable of binding a document as well as storing data pertaining to the document, its type, its location, its transfer route and a very wide range of other information limited only by the imagination.

A further objective is to provide such an invention capable of being located through its mechanical binding.

A still further objective is to provide such an invention capable of data processing and the transfer of such data into and out of the invention.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
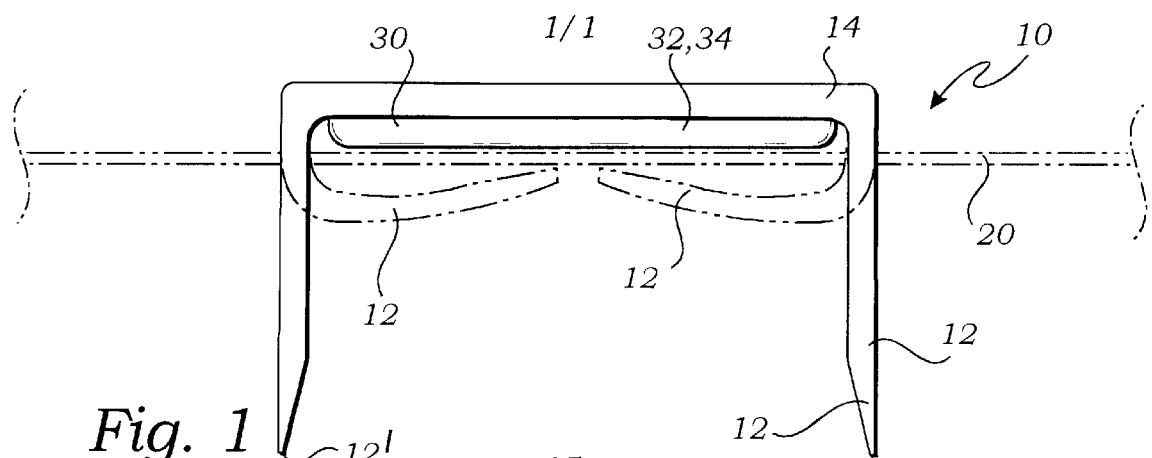
FIG. 1 is a side elevational view, in partial section, of a preferred embodiment of the invention.
Figure 4:
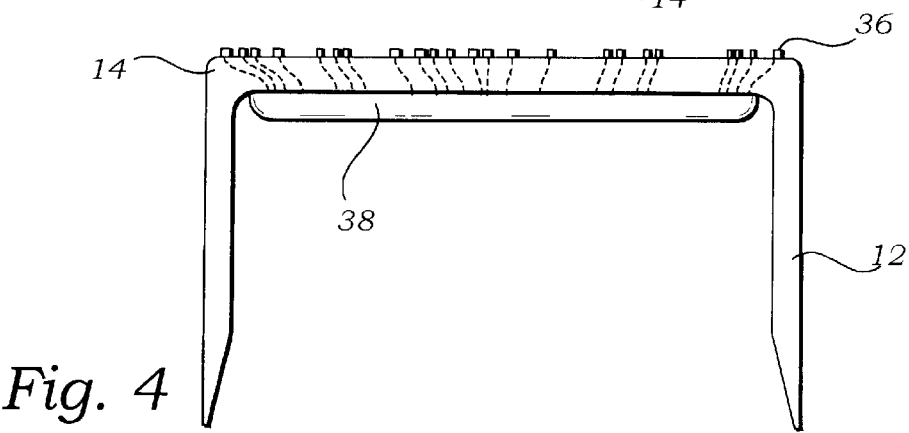
FIG. 4 is side elevational view thereof of the third and fourth embodiment thereof.

As shown in FIG. 1, a fastener apparatus comprises in combination, a mechanical binding means 10 engaging at least one substrate 20, and a microcomputing means 30 integral with the mechanical binding means 10. Preferably, the microcomputing means 30 includes a data storage device 32 providing a capacity for receiving and transferring a quantity of digital data, a data processing device 34 providing a capacity for calculation using the digital data, and, as shown in FIG. 4, a bi-directional data transfer port 36 adapted for receiving the digital data for transfer to the data storage device and to the data processing device and for transferring the digital data from the data storage device and from the data processing device to an outside receiver. The microcomputing means 30, with the several stated internal components 32, 34, and 36, as shown in FIGS. 1 and 4, is a well known device as found in industry today and is assembled and enclosed in a package 38 by well known microchip assembly and encapsulation techniques used throughout industry.

Preferably, the mechanical binding means 10, as shown in the figures, is a common paper staple providing spaced apart leg portions 12 depending from a body portion 14. The leg portions 12 are adapted, by sharpened ends 12', for piercing the at least one substrate 20 and further adapted, by its ductility and temper, or by other selected characteristics of the material from which it is made, for being deformed for enabling it to be easily bound to the at least one substrate 20 and in fact acting to bind the substrate, which is preferably a plurality of sheets of paper, into a document. This process is well known and used in all offices in the business world. Although the preferred embodiment uses a standard U-shaped paper staple, the mechanical binding means of the present invention may be other types of fastening devices including non-piercing types such as edge gripping fasteners. The primary intent of the present invention is in its very advantageous use in the preparation, storage, location and comprehension of documents, but it will be realized by those of skill in the art, that the present invention might well be used in other applications, such as the classifying and identifying of garments in the clothing industry, classifying of toys by attachment to either the toy itself or its wrappers, biomedical products, automotive products and the like. In fact, the present invention will find use in most industries where items are advantageously identified, stored, moved, located and retrieved.

Figure 2:
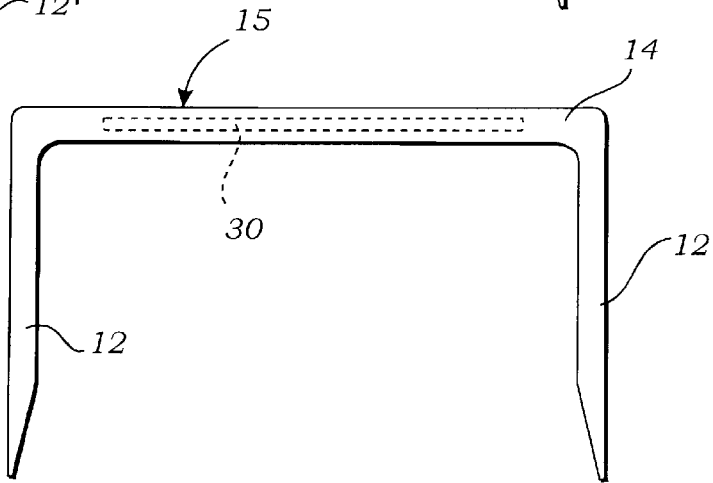
FIG. 2 is a side elevational view of a further preferred embodiment thereof.

As shown in FIG. 1, the microcomputing means may be positioned between the leg portions 12 of the staple 10 where it does not interfere with the binding operation. Alternately, the microcomputing means may be engaged within the body portion 14 of staple 10, as seen in FIG. 2. In this version, the body 14 of the staple 10 is the encapsulating element for the microcomputing device including all of its interconnected and operating sub-elements as described above. As such, this body portion 14 may be made of a plastic or other material typically of use in such microchip encapsulation, while the leg portions 12 may be made of a ductile metal as is normally used in staples. Clearly, variations of this construction may be of use and will be known by those of skill in the related technical arts.

Figure 3:
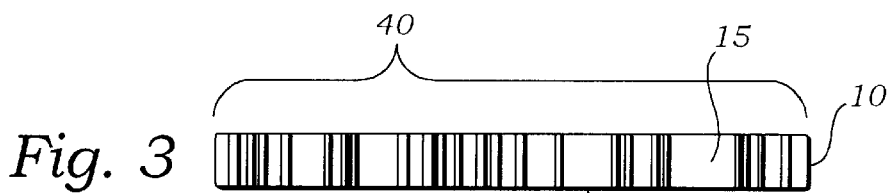
FIG. 3 is a top plan view thereof of a third and fourth embodiment thereof.

The body portion 14 of the staple 10 presents a top surface 15 positioned in an attitude facing away from the at least one substrate 20, the top surface 15 supporting an indicia 40 adapted for coding the apparatus. Such indicia may be any visually recognized scheme such as colors, numbers, or textual material, etc. The coding is preferably an optically readable bar code, as is very well known and broadly used commercially, and as shown in FIG. 3. Likewise, the coding adaptation may be mechanically readable bar code, or other inscription. Such inscription may be embossed into the surface 15 or may be raised portions, as shown in FIG. 4. Such raised coding may be the well known Braille system or any other scheme. These mechanical schemes may be easily designed for mechanical contact reading, as is well known in industry, as by surface profile devices.

The bi-directional data transfer port 36 may be any one or a combination of well known types. It may be at least one electrical contact positioned on any part of the exterior surface of the binding means 10 and is preferably electrically interconnected with the microcomputing means 30. For instance, the bi-directional data transfer port 36 may be an electrostatic array for proximity transfer of the digital data to a static sensitive device brought in close proximity to the array. Further, the bi-directional data transfer port 36 may be a magnetic array for proximity transfer of the digital data. Such is well known in magnetic pickup devices such as used in credit card magnetic readable strips and in magnetic disc storage media. Clearly, the bi-directional data transfer port 36 may be enabled for wave energy proximity transfer of the digital data as through optical scanning of the bar code shown in FIG. 3. FIG. 3 may also be interpreted as the top surface 15 view of FIG. 4. In still another embodiment, the bi-directional data transfer port 36 is a mechanical contact array for either one of electrical current-flow or electrical voltage differential transfer of the digital data. A contact reader is brought into physical contact with the array and reads the current or voltage magnitudes for transfer of the data. The microcomputing means is preferably enabled for password control of data transfer, both the inputting of data, and the extraction as well, in any manner that is well known in the field, as by encryption and decryption techniques as part of software facilitation used by the microcomputing means.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A fastener apparatus comprising in combination: mechanical binding means engaging at least one substrate; microcomputing means integral with the mechanical binding means, the microcomputing means providing a capacity for calculation using digital data, and a bi-directional data transfer port adapted for receiving digital data; wherein the bi-directional data transfer port is a plurality of electrical contacts positioned on an exterior surface of the binding means and electrically interconnected with the microcomputing means, the electrical contacts forming a pattern readable by mechanical contact for electrical current flow, the position of the electrical contacts enabling optical reading a barcode.

2. The combination of claim 1 wherein the mechanical binding means is a staple providing spaced apart leg portions depending from a body portion, the leg portions adapted for piercing the at least one substrate and further adapted for being deformed for enablement in binding to the at least one substrate.

3. The combination of claim 2 wherein the microcomputing means is positioned between the leg portions of the staple.

4. The combination of claim 2 wherein the microcomputing means is engaged within the body portion of the staple.

* * * * *